Feb. 27, 1962 H. J. McARDLE 3,022,821
SUCTION BOX COVER
Filed Jan. 5, 1959
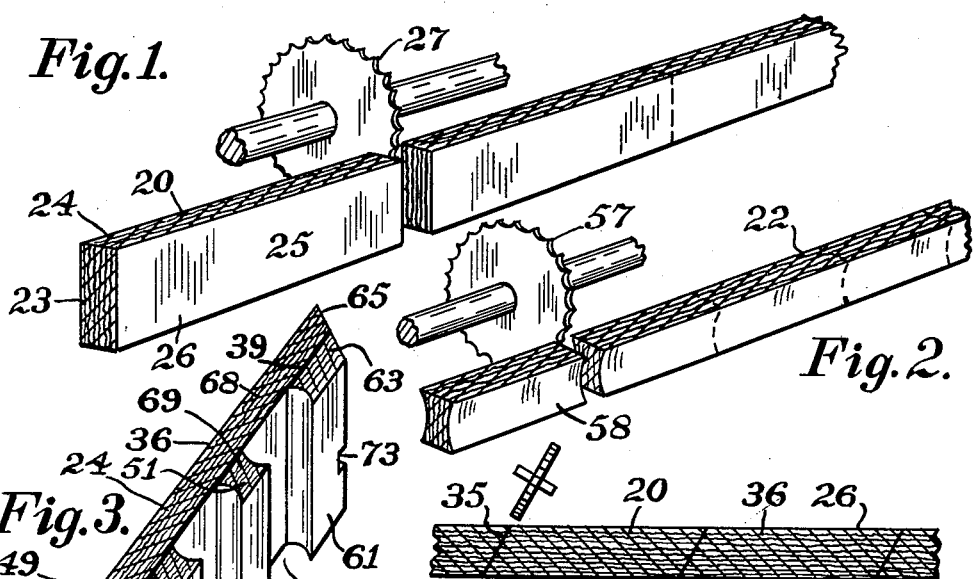
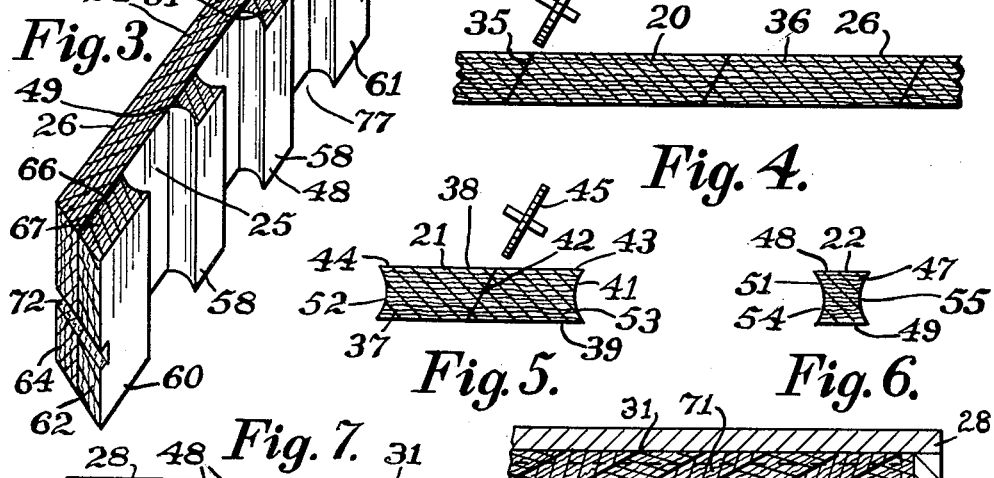
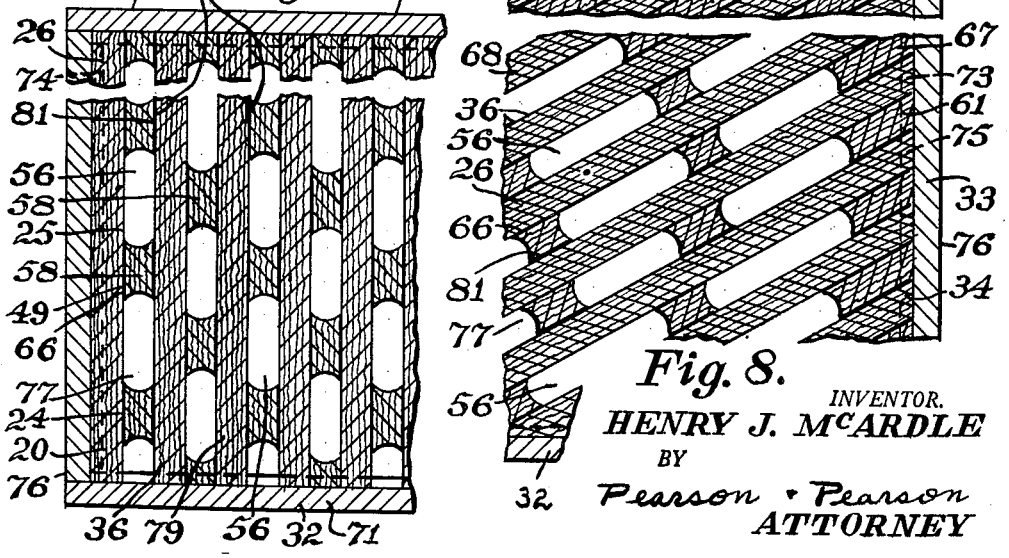
INVENTOR.
HENRY J. McARDLE
BY
Pearson • Pearson
ATTORNEY United States Patent Office 3,022,821
Patented Feb. 27, 1962

3,022,821
SUCTION BOX COVER
Henry J. McArdle, Bellows Falls, Vt.
Filed Jan. 5, 1959, Ser. No. 785,069
2 Claims. (Cl. 162—374)

This invention relates to covers for suction boxes of Fourdrinier paper making machines.

It has long been customary in the trade to provide a frame for such suction box covers, the frame having inwardly projecting ribs upon which a plurality of separate grooved blocks are slidably assembled to form a perforated cover. Such blocks have usually been sawed or milled out of wood and have extended obliquely across the suction box as disclosed in U.S. Patent 708,219 to Gilbert et al. of September 2, 1902, or U.S. Patent 1,375,517 to Johnson of April 19, 1921.

Of late, it has been proposed to make suction box covers of fabric reinforced plastic material, for example canvas impregnated with a phenol formaldehyde resin and laminated under high pressure and temperature as in U.S. Patent 2,740,332 to Van Ryzin of April 3, 1956.

It is the object of this invention to provide an improved suction box cover, and an improved method of making the same, wherein multiple blocks are adhered to each other to form a unitary cover of fabric reinforced plastic material with no interfitting grooves and ribs.

Another object of the invention is to provide multiple blocks, for a suction box cover, of fabric reinforced plastic material, each block including spaced fillers adhesively united to closely spaced, cross strips, the fillers and strips being of equal height and the entire block having the fabric edges uppermost.

A further object of the invention is to provide a suction box cover of the multiple block type wherein each block abuts on, and preferably is adhesively united to, the adjacent blocks and each block is formed of plastic material with spaced vertical fillers adhesively united along one smooth side wall of a cross strip of equal height.

Still another object of the invention is to provide a suction box cover of synthetic plastic material which can be easily made at low cost, without molding, grooving or milling from lengths of plastic strip stock by adhesively united identical short fillers strips of rectangular cross section to parallel elongated cross pieces.

A still further object of this invention is to provide a suction box cover of the multiple block, plastic type wherein each block is of the same plastic material and helps to support adjacent blocks in addition to defining suction slots of oval configuration with adjacent blocks.

Other objects and advantages of the invention will be apparent from the claims, the description of the drawing and from the drawing in which—

FIGS. 1 and 2 are diagrammatic, perspective views showing the steps of forming the cross pieces and filler pieces of the blocks from strips of fabric reinforced plastic material.

FIG. 3 is a diagrammatic view of the step of adhesively uniting the filler pieces at spaced distances along the side of a cross piece to form a suction box cover block.

FIG. 4 is a diagrammatic view showing the step of cutting each cross piece from a strip of stock along an oblique line to create an oblique block.

FIG. 5 is a diagrammatic view showing the step of forming opposite end filler pieces for diagonal blocks by cutting a strip of stock obliquely along the longitudinal centre line thereof.

FIG. 6 is an end view similar to FIG. 5 showing the preferred cross section of a strip of filler piece stock for making oval slots in the suction box cover of this invention.

FIG. 7 is a plan view of one end of a suction box cover made in accordance with this invention, and FIG. 8 is a view similar to FIG. 7 of a suction box cover of the diagonal block type, made in accordance with the invention.

As shown in FIGS. 1 to 5 the suction box cover block of this invention may be formed in a convenient and inexpensive manner from strips of commercially available, fabric-reinforced, plastic material of uniform cross section. The elongated strips 20, 21 and 22 preferably comprise a plurality of alternate laminations of a woven fabric such as canvas, and a phenolic resin impregnated and bonded into a rigid mass under heat and pressure. Any suitable fabric re-inforced plastic material, such as that described in U.S. Patent 2,740,332 to Van Ryzin of April 3, 1956, may be used, the desirable feature of the synthetic material being the "end of grain" wear resistance of the fabric edges which are positioned uppermost to contact the Fourdrinier wire.

The elongated strip 20 is of uniform, rectangular cross section with the fabric reinforcements 23 having their edges 24 uppermost so that the fabric extends parallel to a flat, smooth side wall 25 of the strip 20. The elongated strip 20 is cut into a plurality of cross strips, or pieces, such as 26, by any convenient means, for example, the circular saw 27. Each cross strip 26 is of a predetermined length sufficient to span a suction box, such as 28, from one wall 31 to the opposite wall 32, or to an adjacent wall 33, in the case of end filler blocks, such as 34 (FIG. 8).

As shown in FIG. 7, a strip such as 26 may be cut from strip 20 to extend the full length of the suction box or to extend the full width thereof depending on the suction hole pattern desired.

As shown in FIG. 4 the cross strips 26 may also be cut from strip 20 along the oblique line 35 in order to make the oblique type block 36 shown in FIGS. 3 and 8. The elongated strip 21 is of the same material as strip 20 with the fabric reinforcements 37 parallel to the flat side walls 38 and 39 and edgewise at 41. Preferably the strip 21 is of double the required width and cut obliquely along the longitudinal centre line, as at 42, to form two opposite end filler strips, or pieces, 43 and 44 for the diagonal type block 36. The cut may be made by any suitable means such as the circular saw 45.

The elongated strip 22 is also of the same fabric reinforced, plastic material as strips 20 and 21 with the fabric reinforcements 47 parallel to the flat, smooth side walls 48 and 49 and edgewise at 51. Preferably the strip 21 is concaved, or grooved on its opposite sides as at 52 and 53 and the strip 22 is similarly concaved or grooved on its opposite sides as at 54 and 55. As shown in FIGS. 7 and 8 a generally oval aperture, or suction slot, such as 56 is thus formed, which is desirable in the trade.

As shown in FIG. 2 the elongated filler strip 22 is cut, by suitable means such as saw 57, into a plurality of identical intermediate filler strips, or pieces such as 58, along lines normal to the axis of the strip. Each intermediate filler strip is preferably of a length equal to the height of the cross strips 26 and the strip 20. By a step identical with that illustrated in FIG. 2, the two opposite elongated end filler strips 43 and 44 are similarly cut along lines normal to their axes into separate end filler strips such as 60 and 61 of a length preferably equal to the length of the intermediate filler pieces 58 and equal to the height of a cross strip 26.

As shown in FIG. 3 an oblique block 36 of this invention is formed by adhesively uniting, an end filler piece 60 and 61 at each opposite end of at least one side face such as 25 of each cross strip 26. The oblique walls 62 and 63 of each strip 60 and 61 merge with the oblique wall 64 or 65 of cross strip 26 and are coplanar therewith. A plurality of identical intermediate filler pieces such as 58 are adhesively united, with a side face 49 against the same side face 25 of cross strip 26 at spaced distances therealong. Preferably the adhesive used is epoxy resin shown as the layer of adhesive at 66 in FIG. 3 between the filler pieces and the cross strip. The adhesive layer 66 cures at room temperature in about twenty-four hours but may be cured more rapidly, if desired, in a suitable oven of any well known type. Preferably the filler pieces are clamped to the cross strip in a well known manner while the adhesive sets.

The edges of the fabric reinforcements 37 and 51 of the filler strips 60, 61 and 58 and the edges 24 of the fabric reinforcements 23 of cross strip 26 are all uppermost and the uppermost faces 67, 68 and 69 of the strips are preferably coplanar. The space 77 between the filler strips and the cross strip 26, as shown, is generally oval in outline because of the concaved side walls of the filler strips whereby a plurality of longitudinally spaced oval slots 56 are formed in the suction box cover 71. The end filler pieces 60 and 61 and the intermediate filler pieces such as 58 are applied crosswise of the side face 25 of each cross strip 26 as best shown in FIG. 3.

The blocks 36 are assembled in side by side relationship to form the suction box cover 71 as shown in FIG. 8, each block traversing the cover frame. Preferably each block 36 is grooved at each opposite end as at 72 and 73 to slide on a corresponding rib such as 74 and 75 in the box frame 76 in a well known manner. It is preferred that each block 36 be adhesively united to the adjoining blocks such as 79 by a layer of adhesive such as 81, similar to adhesive layer 66 whereby the entire cover 71 is a bodily transportable, unitary assembly. No extraneous, cross supporting pieces are then necessary since each block helps to support the adjacent blocks.

As shown in FIG. 7 a plurality of elongated strips 26 may extend the full length of the suction box such as 28, with a plurality of spaced filler strips such as 58, having their side faces 49 adhesively united along one face 25 thereof by the layer of adhesive 66. The filler strips 58 are in staggered relation on the various strips 26 to create a staggered suction pattern as illustrated. The opposite side face 24 of each strip 26 is adhesively united to the adjacent side face 48 of each filler strip 58 by a layer of adhesive 81 to create a unitary suction box cover.

I claim:
1. A suction box cover block adapted to be assembled with identical blocks into a suction box cover, said block comprising a cross strip of uniform, rectangular cross section adapted to extend from one edge of a suction box to an opposite edge thereof; a plurality of elongated filler strips equidistantly spaced apart along one side face of, and in parallelism with, said cross strip from one end thereof to the other, each said filler strip being equal in height with said cross strip and of uniform rectangular cross section, a layer of adhesive between one side face of each filler strip and the adjacent side face of said cross strip supporting and adhesively uniting said filler strips thereon, both said cross strips and said filler strips being formed of fabric reinforced plastic material with the fabric edges thereof uppermost and with the upper edges thereof in the same flat plane.

2. In a suction box cover of the type having a plurality of identical, parallel, spaced apart cross strips extending from one edge of said cover to the opposite edge thereof, each strip being of uniform rectangular cross section and upstanding edgewise to define flat upper and lower planar cover faces; the combination of a plurality of filler strips of uniform rectangular cross section, each equal in height with, but of substantially less length than, one of said cross strips, said filler strips upstanding edgewise, at spaced distances apart, in parallelism with said cross strips and filling the spaces between each pair of adjacent cross strips with the upper and lower edges of said filler strips in the planes of the upper and lower cover faces and a layer of adhesive on each opposite side of each said filler strip adhesively uniting the same to the adjacent cross strips for forming a unitary suction box cover with flat planar upper and lower faces broken only by suction holes created by the spacing of said filler strips.

References Cited in the file of this patent

UNITED STATES PATENTS

| | | |
|---|---|---|
| 751,095 | McAnulty | Feb. 2, 1904 |
| 1,832,844 | Cofrin | Nov. 24, 1931 |
| 1,977,352 | Proulx | Oct. 16, 1934 |
| 2,042,198 | Swanger | May 26, 1936 |
| 2,740,332 | Van Ryzin | Apr. 3, 1956 |
| 2,946,379 | Wartiainen | July 26, 1960 |

FOREIGN PATENTS

| | | |
|---|---|---|
| 770,832 | Great Britain | Mar. 27, 1957 |